UNITED STATES PATENT OFFICE.

HERMANN BOEDEKER, OF HÖCHST-ON-THE-MAIN, GERMANY, ASSIGNOR TO THE FARBWERKE, VORMALS MEISTER, LUCIUS & BRÜNING, OF SAME PLACE.

PROCESS OF MAKING SULFONIC ACIDS OF ASYMMETRIC RHODAMINS.

SPECIFICATION forming part of Letters Patent No. 615,791, dated December 13, 1898.

Application filed December 29, 1897. Serial No. 664,436. (Specimens.)

*To all whom it may concern:*

Be it known that I, HERMANN BOEDEKER, doctor of philosophy, a subject of the Emperor of Germany, residing at Höchst-on-the-Main, Germany, have invented certain new and useful Improvements in the Manufacture of Sulfonic Acids of Asymmetric Rhodamins, (patented in Germany June 29, 1895, No. 85,885,) of which the following is a specification.

This invention relates to the production of sulfonic acids of asymmetric rhodamins.

In substituting the two chlorin atoms of fluorescein chlorid by the rests of aromatic or fat amins only symmetric rhodamin dyestuffs have hitherto been produced.

I have found that valuable asymmetric rhodamin dyestuffs may be obtained by first substituting in the fluorescein chlorid one chlorin atom by the rest of any fat or aromatic amin and by allowing to act upon the product of reaction thus obtained, which still contains one chlorin atom capable of reaction, any other fat or aromatic base. Of special technical value are the sulfonic acids of the dyestuffs obtained by means of one molecule of an aromatic and one molecule of a fat amin.

*Example—Manufacture of an intermediate product.*—Thirty-six kilos of fluorescein chlorid are dissolved in an appropriate solvent—such, for instance, as forty kilos of phenol—to which are added 16.5 kilos of hydrochlorid of orthotoluidin. The mass, turning red rapidly, is heated for four to five hours to about 180° centigrade. The cold melt is boiled with water and the residue washed with diluted alcohol. The residual light-red-tinted crystalline powder is soluble with difficulty in alcohol, but easily soluble in hot benzene. It melts at 192° centigrade. It can be sulfonated by treatment with concentrated sulfuric acid. In a similar manner to the preceding example with orthotoluidin I obtained, with other primary and secondary bases, the corresponding intermediate products—thus, for instance, with monethylamin, diethylamin, anilin, paratoluidin, paraphenetidin, mesidin, alpha-naphthylamin, beta-naphthylamin, &c.

*Example—Manufacture of the sulfonic acid of a mixed rhodamin.*—Fifteen kilos of the intermediate product obtained according to No. 1 from fluorescein chlorid and one molecule of orthotoluidin, ten kilos of the hydrochlorid of mono or di ethylamin, 6.5 kilos of chlorid of zinc, and five kilos of lime are mixed and heated to 190° to 200° centigrade. The result is a homogeneous easily-fluid melt, which soon turns deep red and assumes a metallic luster. After completion of the reaction the solidified mass is pulverized and extracted with diluted hydrochloric acid. The orthotolyldiethylrhodamin thus obtained is a dark violet-red powder, soluble in alcohol with a bright bluish-red color. For the sulfonation ten parts, by weight, of it are dissolved in eighty parts, by weight, of concentrated sulfuric acid and heated to 40° to 45° centigrade till a test portion dissolves in alkali. By pouring it into water the sulfonic acid is precipitated. It is then washed, and by dissolving in aqueous alkali the alkali salt is obtained, which is precipitated from the solution with salt. The dried dyestuff forms a bluish-red powder, easily soluble in water, dyeing wool a bright red in an acid-bath. The very even tints are fast to light and soap. It dissolves in concentrated sulfuric acid with an orange color.

In a similar manner, as in example 2, the intermediate product from fluorescein chlorid and orthotoluidin, as well as the above-mentioned intermediate products, may be combined with other aromatic and fat amins—such, for instance, as mono and di methylamin, paratoluidin, anilin, phenetidin, &c.—and transformed into the sulfonic acids by treatment with concentrated sulfuric acid at an appropriate temperature.

Having now described my invention, what I claim is—

1. Process for the manufacture of asymmetric rhodamin dyestuffs or their sulfonic acids consisting in first substituting in the fluorescein chlorid one chlorin atom by the rest of a primary or secondary base of the fat or aromatic series and then allowing to act upon the intermediate product thus obtained another primary or secondary base of the fat or aromatic series and in transforming the dyestuff thus obtained into the sulfonic acid by treatment with concentrated sulfuric acid, substantially as described.

2. As a new product the alkali salt, as above described, of the sulfonic acid of mono and di ethylorthotolylrhodamin forming a dark-red powder, easily soluble in water with a bright-red color, in concentrated sulfuric acid with an orange color and separating on addition of acids to the aqueous solution the free sulfonic acid in red flakes, dyeing wool a bright red in an acid-bath fast to light and soap.

In testimony that I claim the foregoing as my invention I have signed my name in presence of two subscribing witnesses.

HERMANN BOEDEKER.

Witnesses:
HEINRICH HAHN,
ALFRED BRISBOIS.